US008395088B2

(12) United States Patent
Niederer et al.

(10) Patent No.: US 8,395,088 B2

(45) Date of Patent: Mar. 12, 2013

(54) HEAT GENERATING ELEMENT AND ELECTRIC AUXILIARY HEATER FOR A MOTOR VEHICLE WITH HEAT GENERATING ELEMENT

(75) Inventors: Michael Niederer, Kapellen-Drusweiler (DE); Franz Bohlender, Kandel (DE)

(73) Assignee: Catem GmbH & Co., KG, Herxheim Bei Landau (DE)

( * ) Notice: Subject to any disclaimer, the term of this patent is extended or adjusted under 35 U.S.C. 154(b) by 803 days.

(21) Appl. No.: 12/442,605

(22) PCT Filed: Oct. 25, 2007

(86) PCT No.: PCT/EP2007/009280

§ 371 (c)(1), (2), (4) Date: Oct. 30, 2009

(87) PCT Pub. No.: WO2008/049619

PCT Pub. Date: May 2, 2008

(65) Prior Publication Data

US 2010/0044360 A1 Feb. 25, 2010

(30) Foreign Application Priority Data

Oct. 25, 2006 (EP) .................................... 06022337

(51) Int. Cl.
*B60L 1/02* (2006.01)

(52) U.S. Cl. ....................................... 219/202; 219/544

(58) Field of Classification Search .................. 219/202, 219/544

See application file for complete search history.

(56) References Cited

U.S. PATENT DOCUMENTS

| | | | | |
|---|---|---|---|---|
| 5,057,672 | A | 10/1991 | Bohlender et al. | |
| 5,089,688 | A | 2/1992 | Fang | |
| 5,665,261 | A * | 9/1997 | Damsohn et al. | 219/504 |
| 5,922,233 | A | 7/1999 | Ohashi et al. | |
| 6,147,330 | A | 11/2000 | Ikeda et al. | |
| 7,576,305 | B2 | 8/2009 | Zeyen et al. | |
| 7,777,161 | B2 * | 8/2010 | Zeyen et al. | 219/520 |
| 2005/0175328 | A1 * | 8/2005 | Pierron et al. | 392/347 |
| 2007/0068913 | A1 | 3/2007 | Zeyen et al. | |
| 2007/0068914 | A1 | 3/2007 | Zeyen et al. | |
| 2007/0068927 | A1 | 3/2007 | Bohlender et al. | |
| 2007/0145035 | A1 | 6/2007 | Zeyen et al. | |
| 2008/0073336 | A1 | 3/2008 | Bohlender et al. | |
| 2009/0255914 | A1 * | 10/2009 | Bohlender et al. | 219/202 |

FOREIGN PATENT DOCUMENTS

| | | | |
|---|---|---|---|
| DE | 24 38 476 | Al | 8/1974 |
| EP | 0 026 457 | A2 | 9/1980 |
| EP | 0 333 906 | A1 | 9/1989 |
| EP | 0 781 889 | A1 | 7/1997 |
| EP | 1 528 838 | A2 | 4/2005 |
| EP | 1 528 838 | A2 | 5/2005 |
| FR | 2 803 370 | A3 | 7/2001 |
| JP | 7153554 | A | 6/1995 |
| JP | 10086851 | A | 4/1998 |

* cited by examiner

*Primary Examiner* — Eugene Lee

(74) *Attorney, Agent, or Firm* — Boyle Fredrickson, S.C.

(57) ABSTRACT

A heat generating element for heating air in an electric auxiliary heater of a motor vehicle includes at least one PTC heating element and an insulating housing surrounding the PTC heating element as well as electric strip conductors lying against the PTC heating element at opposite sides. The housing is embodied in two parts with a housing shell element and a shell counter element which are lying against each other with the interposition of a sealing strip and sealingly surround the at least one PTC heating element. The present invention further relates to an electric auxiliary heater for a motor vehicle with a layer composition held in a frame, comprising the at least one heat generating element.

15 Claims, 2 Drawing Sheets

HEAT GENERATING ELEMENT AND ELECTRIC AUXILIARY HEATER FOR A MOTOR VEHICLE WITH HEAT GENERATING ELEMENT

BACKGROUND OF THE INVENTION

1. Field of the Invention

The present invention relates to a heat generating element having at least one PTC heating element and an insulated housing surrounding the PTC heating element as well as electric strip conductors lying against the PTC heating element at opposite sides.

2. Description of the Related Art

Such a heat generating element is known as part of an auxiliary heater for a motor vehicle, for example from EP 0 350 528. Other heat generating elements are known, for example, from DE 32 08 802, DE 30 46 995 or DE 28 04 749.

Basically, in such generic heat generating elements, there is a problem in that a low transition resistance is to be provided by good mechanical contacting between the strip conductor and the PTC element, such that current feed to the heat generating element is possible without substantial heating at the phase interface to the PTC element. This requirement becomes in particular relevant if the heat generating element is to be fed with high operating voltages of approx. 500 Volts or more.

In generic electric heating devices, the strip conductor, which is usually formed by an electrically conductive sheet metal strip, is encapsulated by a sleeve surrounding the heat generating element, which sleeve places the strip conductor against the at least one PTC element with some pressure (as in DE 32 08 802). In this prior art, the PTC element with the strip conductors abutting on both sides is surrounded by a metallic sleeve which is coated with silicone rubber inside, so that the conducting sheet metal strips are held in the sleeve in an insulating manner. This arrangement alone is not sufficient for developing sufficient contact pressure for pressing the strip conductors against the PTC element. Correspondingly, the complete layer composition is surrounded by a press plate. The known heat generating element is relatively passive, i.e. the conduction of heat generated by the PTC element to the outside is relatively poor. The known heat generating element correspondingly has a poor thermal efficiency and reacts relatively slowly to changing thermal conditions.

For heat dissipation, it is known for example from EP 0 350 528 to place radiator elements formed by sheet metal strips bent in a meandering manner against both sides of the heat generating element. These radiator elements are placed against the heat generating element under spring pretension. As the strip conductor between the radiator element and the at least one PTC element is provided so as to be freely movable, the strip conductor is placed against the PTC element by means of the spring force. This construction, however, involves the problem that in particular in operation of the heat generating element at high voltages, leakage currents migrating via the radiator elements and/or the frame cannot be prevented. Moreover, the current-bearing parts at the outer side of the heat generating element are exposed, which is critical also for safety reasons.

The heating rod known from DE 28 04 749 also has the above mentioned disadvantage with respect to poor heat conduction, in this heating rod three generic heat generating elements being arranged at an angle of 120° offset to each other about a cylinder axis. Between the individual heat generating elements, there are located cylindrical segment parts of an electric insulating material in which one flow channel each is recessed for a fluid to be heated by the heating rod.

Such a construction is insufficient in particular in the convective dissipation of heat generated by the PTC element by air. Here, heat cannot be dissipated from the PTC element to the extent required.

The problem underlying the present invention is to provide a heat generating element wherein good contacting between the strip conductor and the at least one PTC element can be ensured and which is electrically insulated with respect to the surrounding area in an improved manner. Moreover, with the present invention, an improved electric auxiliary heater for a motor vehicle is to be provided.

OBJECT OF THE INVENTION

For solving the above-mentioned problem, the present invention provides a heat generating element with the features of claim 1. It has a housing consisting of a housing shell element and a shell counter element which are lying against each other with the interposition of a sealing strip and which sealingly enclose at least one heating element.

With the present invention, a retaining frame known for example from EP 0 350 528 is further developed which holds the PTC elements, which are usually arranged at a heat generating element for an electric auxiliary heater on one level one after the other, in their positions and which in particular takes care that the respective PTC heating element does not fall out of the auxiliary heater. With the present invention, this retaining frame known per se is embodied as a housing which does not only hold the PTC heating element or elements in one level in a predetermined manner and spaces them apart with respect to each other, but moreover seals the PTC heating elements with respect to the surrounding area. To this end, the invention suggests a shell-type housing which comprises a housing shell element and a shell counter element. The two housing elements are lying against each other with the interposition of a sealing strip such that the edges of the housing elements which grip over the at least one PTC heating element at the edge sealingly enclose the PTC element. The housing is embodied as a plane component which is preferably oblong and strip-like in case of several PTC heating elements at a heat generating element, and the height of the component is preferably not greater than the height of the corresponding PTC heating elements. At least one housing element, namely the housing shell element, should grip the PTC heating element at the edge. This edge-side mounting is closely lying against the shell counter element with the interposition of the sealing strip, and the shell counter element can be, for example, embodied like a housing shell or else can be essentially embodied as plane strip, so that the lateral edges of the housing shell element essentially extend over the complete height of the PTC heating element.

From U.S. Pat. No. 6,147,330, a heat generating element with two housing elements for accommodating a PTC element is known, the housing elements being held under pretension with the elastic pretensioning force of a compressible element. Correspondingly, the two housing elements comprise webs overlapping each other which clamp the elastic compression element between them. The two housing elements have to be shifted in the longitudinal direction one upon the other during assembly with the interposition of the compression elements. These compression elements place radiator elements against electrodes of a multi-layer PTC element under pretension. To this end, the housing elements overlap the radiator elements at the bottom.

The compression elements according to U.S. Pat. No. 6,147,330 correspondingly act as mechanical pretensioning means which pretension the two housing elements with the interposition of the bottom ends of the radiator elements with respect to each other.

The construction of the known heat generating element, however, involves quite an amount of efforts. In particular the manufacture makes it necessary that the two housing elements are shifted one upon the other in the longitudinal direction while the compression element is located between the respective webs of the housing elements. Furthermore, the compressive force effected by compression elements is not sufficient for ensuring good contacting between the electrodes and the PTC element. This good contacting is necessary to ensure a resistanceless or low-resistance transmission of electric current from the electrodes to the PTC element as well as good heat extraction of heat generated by the PTC element.

The present invention adheres to the principle that the electrodes are formed by strip conductors which are pressed against the PTC element under the pretension of a spring force acting on the layer composition from the outside (cf. in particular EP 0 350 528).

However, the present invention provides a heat generating element for a corresponding auxiliary heater with a frame wherein good contacting between the strip conductor and the at least one PTC element is ensured and which is electrically insulated with respect to the surrounding area in an improved manner. For this, a sealing strip which is provided at opposite front sides of the housing elements is decisive. In particular those surfaces of the housing elements are considered as front sides of the housing elements which directly limit an accommodation area for the at least one PTC element which is formed by the corresponding housing shell element, extend essentially in parallel to a contact surface formed by the corresponding housing shell element and have the same orientation as the contact surface, i.e. can be seen in a plan view onto the housing shell element in the accommodation area for the at least one PTC heating element. The sealing strip can be an adhesive tape which first connects the housing shell elements with each other and is in a way compressible to permit stronger pressing of the PTC elements against the contact surfaces of the housing shell elements. A compression force possibly acting on the sealing strip in other words urges the housing shell elements apart. The sealing strip, however, can also be formed as a groove which engages with an opening recessed at the other housing element. For the sealing element it is essential to bridge a gap embodied between the two housing shell elements in a sealing manner and moreover to preferably permit a certain movability of the housing shell elements towards each other or away from each other without said gap opening to the outside.

A sealing strip in the sense of the present invention can, for example, be a sealing element arranged between opposite front sides of the housing shell elements which is supported on said front sides. Alternatively, the sealing strip can also be formed integrally with the housing shell element or the housing shell counter element. One here in particular thinks of a groove-spring-connection. With such a groove-spring-connection, the spring forms the sealing strip. The spring engages with a groove formed at the other housing element which is preferably dimensioned such that the two housing elements are movable within certain limits across a plane which extends in parallel to the strip conductors. The groove-spring-connection moreover prevents direct access to the interior of the housing from the outside and thus forms a sealing strip in the sense of the present invention.

The above discussed movability of the two housing elements relative to one another in a direction across a plane extending in parallel to the two strip conductors permits a certain adjustment of the clear distance of the strip conductors provided in parallel, so that work tolerances in particular of the PTC heating elements can be compensated without having to dispense with a flat and good contact of the PTC heating element or elements at the respective strip conductors. A corresponding movability also results from a sealing strip having a certain compressibility and being supported between opposite front sides of the housing elements. Here, it is only important that the two housing elements are at least slightly movable with respect to each other across the plane extending in parallel to the strip conductors without the sealing of the interior of the housing being lost. The movability should be preferably embodied such that said work tolerances due to PTC heating elements of different thicknesses and/or thermal stresses in operation of the heat generating element can be followed by a relative motion between the two housing elements. One assumes that to this end a movability of only a few tenths of millimeters is sufficient. This does not necessarily mean that greater movability has to be constructively prevented. The heat generating element is rather suited for being assembled in a layer composition consisting of heat generating elements and radiator elements which is held under compressive stress, so that the strip conductors are lying against the PTC heating element at any time and the structural integrity of the housing is ensured by the compressive force acting from outside.

As far as the description of the present invention is directed to the sealing of the PTC heating element, here in particular a view in the circumferential direction takes effect. The heat generating element normally forms a strip-like layer of a layer composition which comprises at least one, preferably two radiator elements lying against opposite sides at the heat generating element. These are arranged in a frame. The radiator elements and the heat generating elements are lying as oblong layers of the layer composition within the frame. Here, the housing serves for fixing the PTC heating element or elements within the layer of the heat generating element in a direction across the longitudinal extension of the heat generating element as well as preferably also in the longitudinal direction of the heat generating element. To this end, spacers or the like can be provided at the housing and hold the PTC heating elements arranged on one level one after the other at a predetermined distance.

The housing elements are preferably formed of highly insulating plastics, for example of an electrically high-grade polyamide or Teflon. The material employed in each case should have high creep resistance. The CTI value for the PTC element accommodated in the housing should be at least 400, preferably 600. If at least one housing element is embodied as molded part it is practical to provide an insulation layer and/or a sheet metal strip fixed thereto by attaching it around the same by injection molding, wherein the insulation layer normally forms the outer side of the heat generating element extending in parallel to the upper or lower side of the PTC heating element. The sheet metal strip preferably lies directly between the insulation layer and the PTC heating element contacting the same and serves for feeding it with current. The above mentioned molded part can conventionally be a molded plastic part, preferably of the electrically high-grade plastics already mentioned above. Alternatively, in any case one housing element can be formed as CIM component (Ceramic Injection Molding). To this end, the ceramic powder for the manufacture of the at least one housing element is mixed with plastics to obtain a free-flowing suspension which is processed with an injection molding machine. Then the binder is removed from the molded green compact. Then, the brown compact thus obtained is compressed to form a sintered ceramic part.

For example a housing element formed as sintered ceramic part can cooperate with the molded plastic housing element. This ceramic part can, for example, contact as plane plate the molded plastic part having a U-shaped cross-section and gripping the at least one PTC heating element laterally with the interposition of the sealing strip. Thereby, in a simple manner a circumferential insulation for the PTC element is created. The band-like ceramic part in turn forms the outer side of the housing. On the inner side, normally between the ceramic part and the PTC heating element, a further sheet metal strip is provided against which the PTC heating element is directly lying and by means of which the PTC heating element is fed with current.

Naturally, it is conceivable to also form the essentially U-shaped housing element accommodating the PTC heating element as ceramic component. It proved to be particularly practical to form the ceramic parts as sintered parts formed of alumina. Equally, both housing elements can be embodied of molded plastic parts.

It showed to be particularly practical to embody both housing elements, i.e. the housing shell element and the shell counter element, as identical components which each have a U-shaped cross-section and grip the edge of a portion of the PTC heating element. In this case, the housing shell element and the shell counter element essentially have half the thickness of the PTC heating element. Each of the housing elements as shell element laterally encloses a portion of the PTC heating element. This embodiment offers the advantage that both housing elements can be manufactured in an identical mold. Moreover, merchandise management and storage as well as production logistics are facilitated as the housing is embodied by two identical components.

The sealing contact of the two housing elements by means of the sealing strip can be effected by an external force which is exerted on the heat generating element from the outside after the installation of the heat generating element into an electric heating. This can be a spring force acting on the layer composition from the outside which is known, for example, from EP 0 350 528.

Alternatively or additionally, the sealing strip can also have an adhesive function, so that the housing shell element and the housing counter element are glued to each other by means of the sealing strip. This gluing can be such that the components are permanently placed against each other in a fixed manner. It is also conceivable to apply the sealing strip such that it exerts a pulling force on the opposite housing elements, so that work tolerances, in particular due to the PTC heating element, as well as extensions due to temperature differences can be compensated by the sealing strip which provides uniform elastic pretension of the housing elements which normally comprise each a sheet metal strip, which directly lie against one side, which is always the upper or lower side of the PTC heating element, and supply it with current. In particular if high voltages are applied, it has to be taken care that at the phase interface between the sheet metal strip and the PTC heating element, no considerable transition resistance occurs at the point where current is fed into the PTC heating element. To this end, the two housing elements are preferably placed against each other under pretension. This pretension is either generated by the sealing strip or—which will probably be the rule—by a tension force acting on the housing from the outside, leading to a compression of the sealing strip for sufficiently sealing the two housing elements with respect to each other.

If the heat generating element according to the invention is arranged under spring pretension in a frame as part of a layer composition, for example according to EP 0 350 528, the adhesive sealing strip can join the two housing elements to form a unit which can be more easily handled and installed during assembly.

Preferred further developments of the heat generating element according to the invention are given in claims 2-13.

With the present invention, furthermore an electric auxiliary heater with a frame and a layer composition accommodated in the frame is claimed, comprising at least one heat generating element according to one of claims 1-13 and at least one radiator element extending in parallel to the heat generating element. As radiator element, here preferably any element that is a good conductor for heat is meant which by means of ribs gives off heat to the air flowing against the radiator element, the heat being introduced by the heat generating element by heat conduction. Typical radiator elements are formed of a sheet metal strip bent in a meandering manner or formed as extruded aluminum section and preferably have at least one plane contact surface for placing the heat generating element against it. Preferred further developments of the electric auxiliary heater according to the invention are given in claims 13 and 14.

BRIEF DESCRIPTION OF THE DRAWINGS

The present invention will be illustrated more in detail below with reference to the drawings by means of two embodiments. In the drawing.

DETAILED DESCRIPTION OF THE PREFERRED EMBODIMENT

Figure 1:
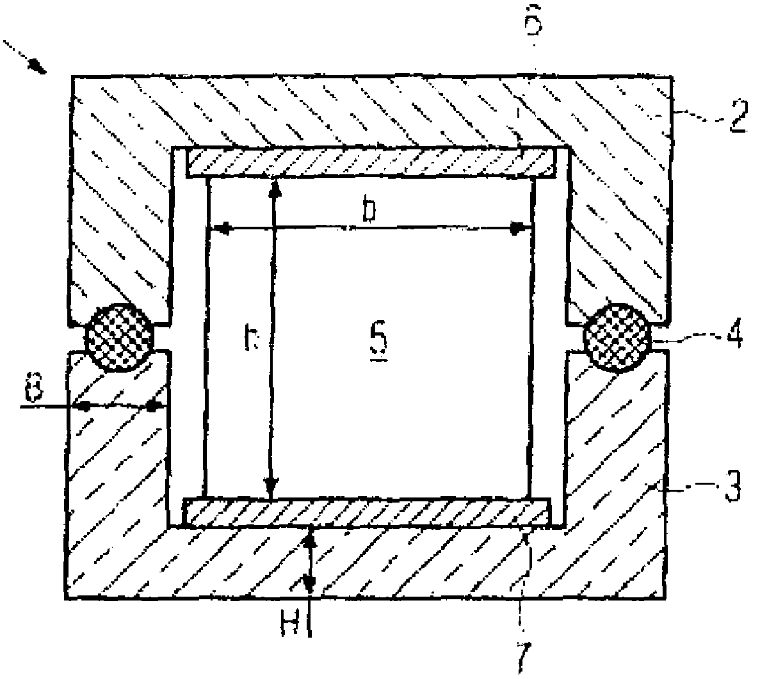
FIG. 1 shows a cross-sectional view of a first embodiment of a heat generating element.

FIG. 1 shows a cross-sectional view of a first embodiment of a heat generating element 1 which comprises two oblong U-shaped housing elements 2, 3 which are embodied each as sintered alumina components. The webs of each individual housing element 2, 3 situated opposite to each other are lying against each other at the front side with the interposition of a sealing strip 4. The thus created space which is electrically sealed at the circumference accommodates several PTC heating elements arranged one after the other in the longitudinal direction of the heat generating element 1 (across the drawing plane), here only one heating element 5 being shown.

Between the PTC heating element 5 and the two housing elements 2, 3, sheet metal strips 6, 7 are provided each as strip conductors for feeding the PTC heating elements 5 with current. As usual, the strip conductors can project from the housing elements 2, 3, at the front end thereof to there possibly project from the outer side of a frame surrounding the heat generating elements and holding them under pretension in a layer composition to there embody electrical frame terminals.

The thickness of the sealing strip 4 is selected such that possible work tolerances as concerns thickness of at least one PTC element 5 can be compensated by compression of the sealing strip 4 without adjoining of the two housing elements. In this connection it should be noted that PTC heating elements are subject to certain dimensional variations due to manufacturing. If the elastic properties and the dimension of the sealing strip 4 are adapted, such tolerances as concerns thickness (in the direction of the arrow h) can be compensated by compression of the sealing strip, so that in the possible deviations as concerns thickness, always a circumferential sealing of the interior accommodating the PTC heating element is given.

In the embodiment shown in FIG. 1, the dimensions are selected such that a lateral edge which laterally grips the at least one PTC heating element has a width B which is not broader than 15% of the width b of the PTC heating element 5. Between the height H of the ceramic housing element 2, 3 at the lower or upper side and the height h of the PTC heating element 5, there is a ratio of 0.7:10. The height H is in this case defined as the distance between the upper or lower side of the housing element 2, 3 and the inner side of the element 2, 3 forming the contact surface for the sheet metal strip 7. Correspondingly, the heat generating element is relatively flat. The support for the PTC heating element 5, i.e. the ceramic back of the element 2 or 3, does not take more than 7.5% of the height of the PTC heating element 5. This back alone provides the support for the PTC heating element.

The compression of the sealing strip of compressible plastics supported at the opposite front sides of the two housing elements 2, 3 leads to a certain movability of the two housing elements 2, 3 across a plane extending in parallel to the lower or upper sheet metal strip 6, 7.

Figure 2:
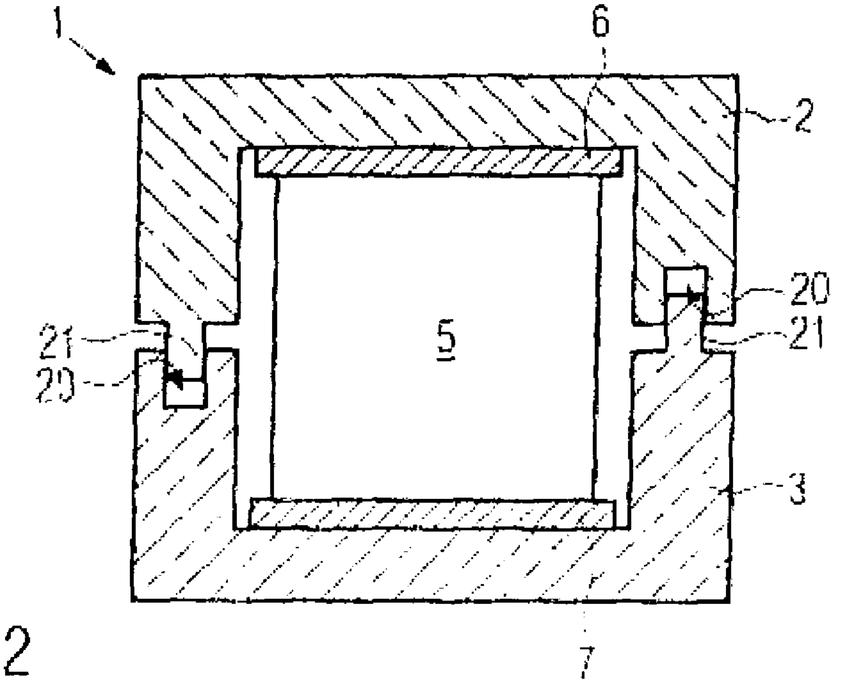
FIG. 2 shows a cross-sectional view of a second embodiment of a heat generating element.

In FIG. 2, a cross-sectional view of a second embodiment is shown. Same components are designated with the same reference numerals with respect to the embodiment shown in FIG. 1.

The embodiment shown in FIG. 2, too, has two identical housing elements 2, 3 for facilitating production. One of the front sides of the respective housing elements 2 and 3 formed by the edges has a groove 20; a spring 21 projects from the other front side. The spring 21 of one of the housing elements 2, 3 is engaged with the complementarily formed groove 20 of the other housing element 3, 2, so that the interior of the housing 2, 3 is sealed. For this, it should be taken care that the width of the groove 20 is only slightly larger than the thickness of the spring 21. The depth of the groove 20 or the length of the spring 21 are selected such that, if PTC elements 5 are accommodated in the housing, these flatly lie against the sheet metal strips 6, 7, and that the housing elements 2, 3, in case of shrinkage and/or setting amounts or due to work tolerances, in particular on the side of the PTC elements 5 can be at least slightly moved towards each other and that with the work tolerances or the thermal expansions to be expected the groove 20 or the spring 21 are engaged with sufficient overlap for sealing the housing.

Figure 3:
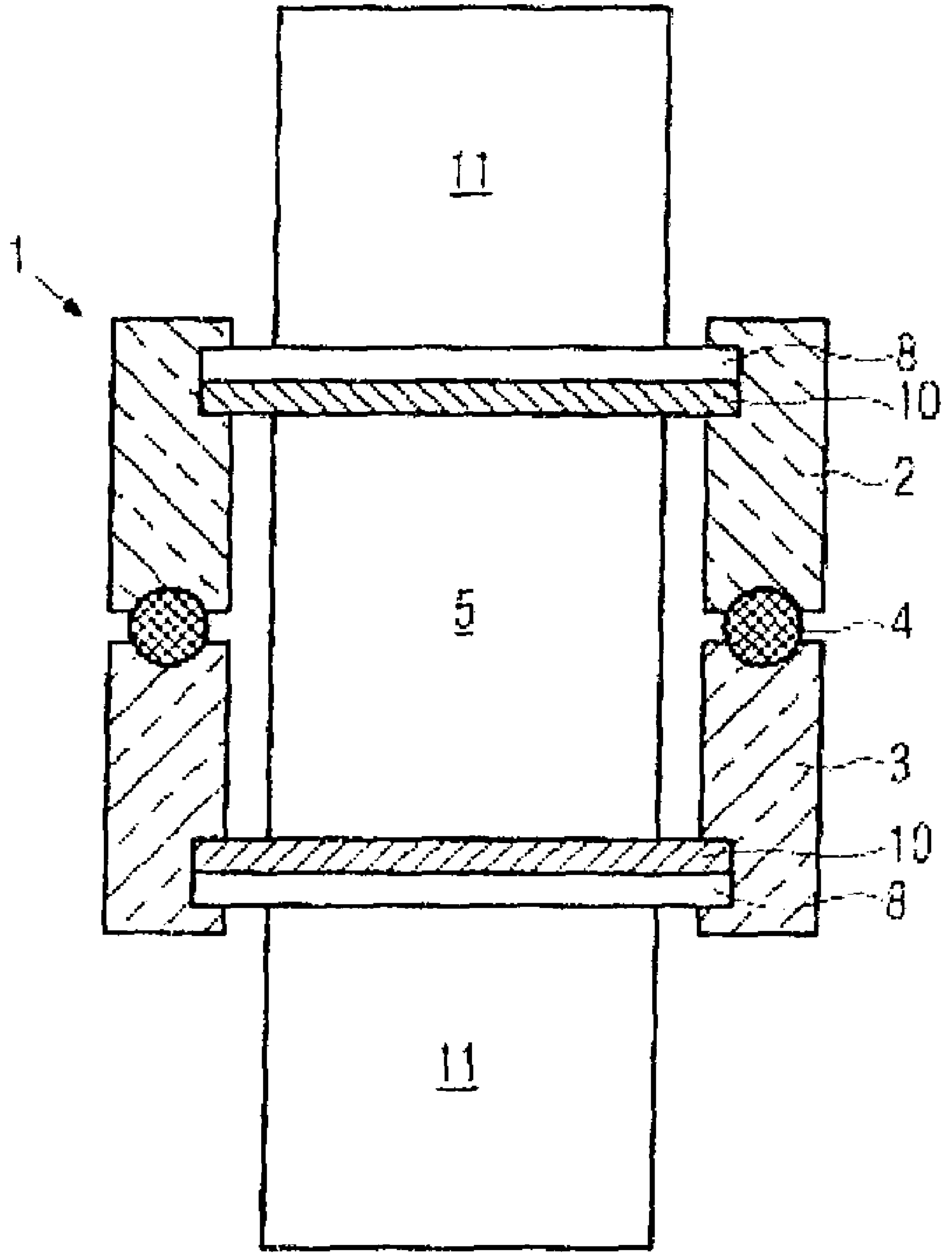
FIG. 3 shows a cross-sectional view of a third embodiment of a heat generating element according to the invention with the radiator elements of an electric auxiliary heater.

In FIG. 3, an alternative embodiment of a heat generating element 1 is shown in a cross-sectional view. In this embodiment, too, not only the housing shell element 2, but also the shell counter element 3 is embodied like a shell. Both housing elements 2, 3 are made as molded plastic parts around which an alumina strip 8 as insulation layer as well as a sheet metal strip 10 are molded which is directly lying against it at the inner side and contacts the PTC heating element 5. The alumina layers 8 form the outer sides of the heat generating element 1 at the upper and lower sides. In this direction, the heat generating element 1 is relatively thin, so that heat generated by the PTC heating element can nearly without obstructions reach a radiator element 11 by conduction. In the shown embodiment, the radiator elements 11 are additionally laterally gripped by the plastic material of the two housing elements 2, 3 and thus held in position. Especially, the edges of the housing elements 2, 3 generated by molding them around the housing elements project from the alumina layer 8 outside, whereby the radiator elements 11 directly lying against the alumina layer 8 cannot be shifted across the layer composition shown in FIG. 2.

The electric auxiliary heater for a motor vehicle indicated in FIG. 3 is surrounded by a frame 30 which accommodates heat generating elements 1 and radiator elements 11. Normally, several layers of radiator elements 11 and heat generating elements 1 are provided and held in the frame 30 under spring pretension. To this end, the spring can be accommodated in the edge region of the frame 30, integrated in the frame 30 or accommodated in the center of the frame 30 within the layer composition. Normally, the radiator elements 11 will be arranged directly adjacent to the radiator elements 1 and place the spring holding the layer composition under spring pretension against two radiator elements. The layer composition formed in this manner is exposed within the frame 30 and air flowing against the frame 30 can flow through it. The electrical connection of the heat generating elements 1 is normally made by laterally extending individual sheet metal strips beyond the frame 30 to the outside.

For the realization of the electric auxiliary heater it is essential to seal the PTC heating elements 5 in the circumferential direction so that laterally incoming air, also if it brings about moisture or contamination, cannot directly reach the PTC heating element. It moreover showed that just a possible leakage current between the sheet metal strips 6, 7 opposite to one another is to be prevented. Accordingly, the strip conductors 6, 7 can also be easily exposed in a manner known per se at a spar of the frame 30 extending across the layer composition, if here moist and/or contaminated air does not contact the heat generating element and can possibly cause electrical sparkover between the strip conductors of different polarities.

For avoiding leakage currents, the leakage current path should be maximized. A leakage current path in the embodiment in FIG. 1 is then the path from the edge of the upper sheet metal strip 7 along the inner surface of the housing shell element 2, partially over the front side of the edge section of this housing shell element 2 and over the partial circumferential surface of the sealing strip 4 to the front side of the shell counter element 3 and further at the inner wall of this shell counter element 3 to the front side of the lower sheet metal strip 7 on the side of the edge. This leakage current path should be at least 2.5 mm for the applications considered here at a voltage of up to 500 Volts. The leakage current path can be enlarged, for example by contouring at the front sides of the housing elements 2, 3, if this is formed within the sealing strips 4. Alternatively, the inner wall of the two housing elements 2, 3 can be contoured for extending the leakage current path. Equally, the width of the sheet metal strips can be reduced in any case to the exact dimension of the PTC heating element 5. For the same reasons, one can do without molding around the sheet metal strip 10 shown in FIG. 3 and it can be placed instead onto the ceramic plate 8. Such an embodiment in particular lends itself if the heat generating element is arranged as part of a layer composition in a frame 30 to form an auxiliary heater similar to EP 0 350 528 where the individual layers of the heat generating and heat dissipating layer composition are held in the frame 30 under pressure of at least one spring.

The present invention is not restricted to the shown embodiments. The compressible sealing strip 4 can also be integrally embodied with housing elements 2 and 3, respectively, formed of plastics. In particular, the embodiment of the housing elements 2 and 3, respectively, by a thermoplastic elastomer is considered which is per se sufficiently compressible to permit a sealing and relative movability of the housing elements 2, 3 with respect to each other. The thickness of the housing elements 2,3, that means the height H or the width B according to FIG. 1, should not exceed 1.5 mm. For this dimension, in any case a lower limit of 0.45 mm is considered at present for stability reasons.

The invention claimed is:

1. An electric auxiliary heater comprising:

a frame; and a layer composition accommodated in the frame, the layer comprising at least one heat generating element and at least one radiator element extending in parallel thereto, wherein the heat generating element includes:

at least one Positive Thermal Coefficient, "PTC", heating element;

an insulating housing surrounding the PTC heating element and electric strip conductors lying against opposite sides of the PTC heating element, wherein the housing comprises housing elements including a shell element and a shell counter element that lie against each other with the interpositioning of a sealing strip bridging opposite front sides of the housing elements, and wherein the sealing strip (i) seals the housing elements with a compressive force acting on the heat generating element from the outside and pressing the strip conductors against the at least one PTC heating element and (ii) sealingly surrounds the at least one PTC heating element, and wherein the compressive force is formed by the force of a spring holding the layer in place under spring pretension.

2. The auxiliary heater according to claim 1, wherein the sealing strip is embodied such that, the housing elements are slightly movable with respect to each other in a direction across a plane which extends in parallel to the strip conductors while maintaining the sealing effect provided by the sealing strip.

3. The auxiliary heater according to claim 1, wherein the housing shell element and the housing counter element are glued to each other via the sealing strip.

4. The auxiliary heater according to claim 1, wherein at least one of the housing elements is embodied as a sintered ceramic part, and wherein a sheet metal strip conductor is placed on the ceramic part adjacent to the PTC heating element.

5. The auxiliary heater according to claim 4, wherein the ceramic part is a sintered part formed of alumina.

6. The auxiliary heater according to claim 1, wherein the at least one PTC heating element comprises a molded plastic part, and further comprising a molded part around each housing part, each molded part comprising an insulation layer and a sheet metal strip fixed to the insulation layer.

7. The auxiliary heater according to claim 6, wherein a support of the at least one PTC heating element is formed exclusively by at least one of the sheet metal strip and the ceramic part.

8. The auxiliary heater according to claim 1, wherein the housing shell element and the shell counter element are embodied as shell elements essentially gripping half the thickness of the at least one PTC heating element laterally.

9. The auxiliary heater according to claim 8, wherein the housing shell element and the shell counter element have an identical design.

10. The auxiliary heater according to claim 1, wherein the sealing strip is dimensioned such that possible work tolerances as concerns thickness of the at least one PTC heating element can be compensated by compression of the sealing strip without adjoining the two housing elements.

11. The auxiliary heater according to claim 1, wherein an edge (B), formed by the housing elements and laterally gripping the at least one PTC heating element, is not broader than 14.5 mm.

12. The auxiliary heater according to claim 1, wherein a support for the at least one PTC heating element, formed by at least one of the housing elements, is not higher than 140% of the height of the at least one PTC heating element.

13. The electric auxiliary heater according to claim 1, wherein the layer composition is held in place within the frame under spring pretension.

14. The electric auxiliary heater according to claim 1, wherein the housing shell element and the housing counter element are sealingly placed against each other via the sealing strip by the force of a spring.

15. An electric auxiliary heater comprising:

a frame; and a layer composition accommodated in the frame, the layer comprising at least one heat generating element and at least one radiator element extending in parallel thereto, wherein the heat generating element includes:

at least one Positive Thermal Coefficient, "PTC", heating element;

an insulating housing surrounding the PTC heating element and electric strip conductors lying against opposite sides of the PTC heating element, wherein the housing comprises housing elements including a shell element and a shell counter element that lie against each other with the interpositioning of a sealing strip bridging opposite front sides of the housing elements, and wherein the sealing strip (i) seals the housing elements with a compressive force acting on the heat generating element from the outside and pressing the strip conductors against the at least one PTC heating element and (ii) sealingly surrounds the at least one PTC heating element, wherein the compressive force is formed by the force of a spring holding the layer in place under spring pretension, wherein wherein the at least one PTC heating element comprises a molded plastic part, and further comprising a molded part around each housing part, each molded part comprising an insulation layer and a sheet metal strip fixed to the insulation layer, and wherein the sealing strip is dimensioned such that possible work tolerances as concerns thickness of the at least one PTC heating element can be compensated by compression of the sealing strip without adjoining the two housing elements.

* * * * *